United States Patent [19]

Taylor

[11] Patent Number: 5,505,975
[45] Date of Patent: Apr. 9, 1996

[54] METHOD FOR HIGH TEMPERATURE, HIGH PRESSURE COOKING

[76] Inventor: Robert A. Taylor, 368 Ferry Point Rd., Pasadena, Md. 21122

[21] Appl. No.: 348,905

[22] Filed: Nov. 25, 1994

[51] Int. Cl.⁶ .................................................... A23L 1/00
[52] U.S. Cl. .................................... 426/510; 426/523
[58] Field of Search ................................ 426/510, 523; 99/330

[56] References Cited

U.S. PATENT DOCUMENTS

| | | | |
|---|---|---|---|
| 4,225,555 | 9/1980 | Fahlvik et al. | 422/26 |
| 4,506,598 | 3/1985 | Meister | 426/510 |
| 5,240,730 | 8/1993 | Jamet | 426/510 |

*Primary Examiner*—George Yeung
*Attorney, Agent, or Firm*—Sughrue, Mion, Zinn, Macpeak & Seas

[57] ABSTRACT

Meat such as poultry may be rapidly cooked in a closed and sealed pressure vessel subjected to a mixture of superheated steam and superatmospheric compressed air at a temperature of least 400° F. and at an internal chamber pressure of at least 15 psig fed from an air compressor through a heat exchanger. Water is mixed with the heated superatmospheric compressed air such that a mixture of superheated steam and superatmospheric compressed air is created prior to mixture entry into the interior of the pressure vessel. Preferably, meat is cooked rapidly at a temperature within the chamber in the range of 400° F. to 600° F. and at pressures ranging from 15 to 150 psig. A pressure relief valve coupled to the pressure vessel exhausts the mixture of superheated steam and superatmospheric compressed air to maintain the desired gas pressurization within the chamber.

10 Claims, 1 Drawing Sheet

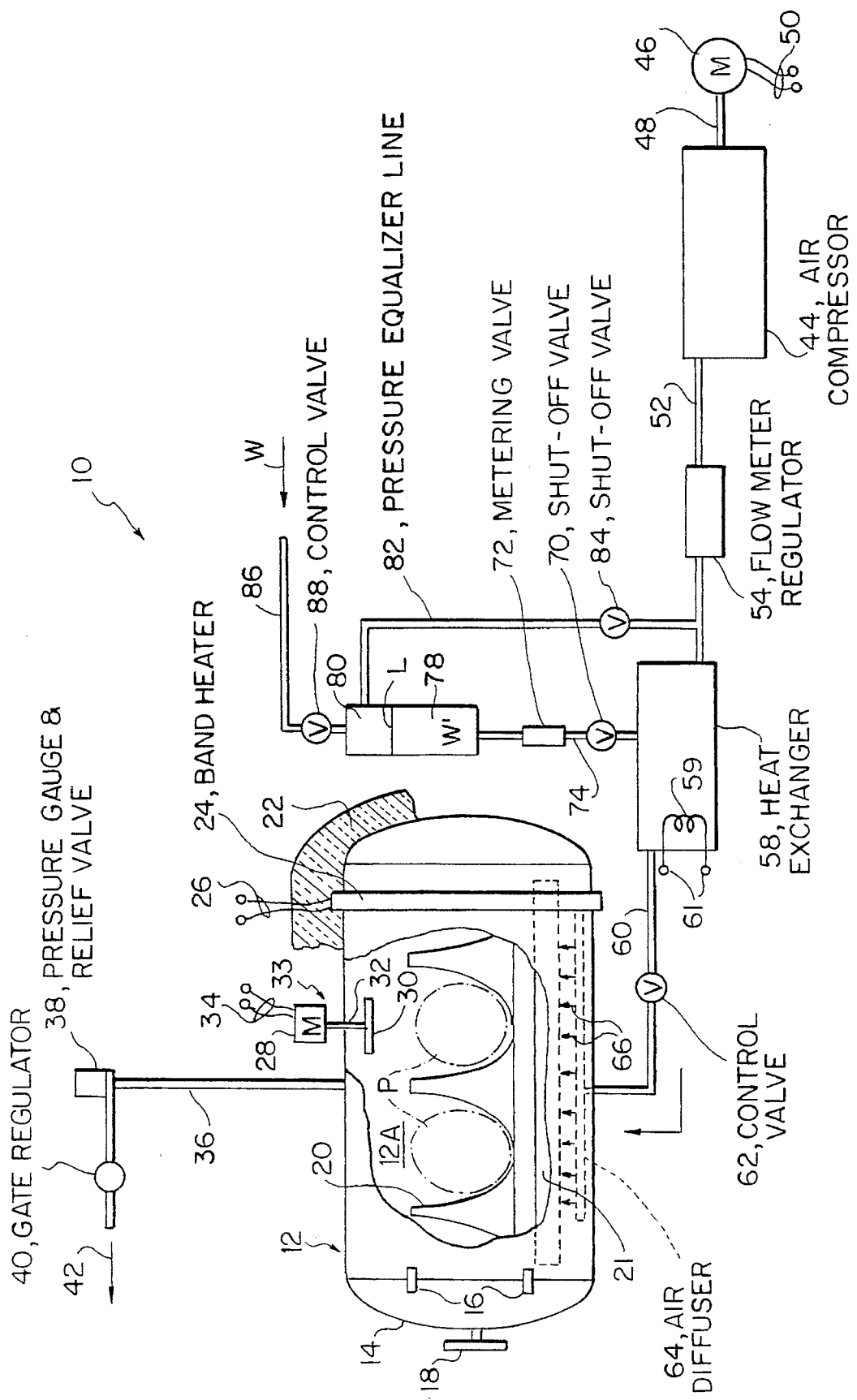

METHOD FOR HIGH TEMPERATURE, HIGH PRESSURE COOKING

FIELD OF THE INVENTION

This invention relates to the high speed cooking in general, and more particularly to a method and apparatus for cooking poultry and other meats within a pressure vessel subjected to superatmospheric pressure, with the meat being heated and browned simultaneously by preheated compressed air.

DESCRIPTION OF THE PRIOR ART

In the past, high-speed cooking of poultry and poultry parts as well as other foods has been achieved by frying, in which whole chicken, or chicken parts for example, are deep fat fried within minutes. However, the cooking oil adds fat and cholesterol, if animal oil is used. If other than animal oil is used, the deep fat fried meat retains its fat and the deep fat frying may adversely affect the flavor of the cooked meat.

Roasting of poultry is in current vogue because of the concern for cholesterol and high fat content of fried poultry. Conventional roasting, and a more recent method called "rotisserie cooking", permits the cooking of meat and other foods in an oven. The problem with this method is the overall time to achieve a fully cooked product. At fast food restaurants, it normally takes from 1½ to 2 hours to cook a whole 3 to 4 pound chicken. In supermarket delicatessens and the like, it normally takes from 45 minutes to one hour to cook a chicken in a convection oven.

Attempts have been made to roast and cook meat, particularly poultry, in a time period substantially reduced from that of the fast food restaurants and the supermarket delicatessens. Such attempts involve the cooking of the meat in pressure vessels, where the meat is subjected to superatmospheric pressure. Some such attempts have involved using compressed air which is fed to a pressure vessel within which the meat is placed for cooking, or subjecting the meat while moving on a conveyor to a compressed air stream which is preheated. Other attempts have been employed wherein the meat is subjected to superatmospheric pressure within a suitably thermally insulated pressure vessel, while heat is supplied to the interior of the vessel via electrical heating coils internally or exteriorly of the vessel.

U.S. Pat. No. 1,768,172 is directed to the cooking of hams and meats of various kinds by a flame burner beneath a pressure vessel. Hams are carried on racks interiorly of the vessel and the interior of the vessel is subjected to a current of preheated air to carry away the gases and vapor generated during the cooking process.

U.S. Pat. No. 1,732,289 is directed to the cooking of a food product such as hams in an insulated pressure vessel by preheated compressed air from an air compressor at a temperature of about 175° F. and at 40 pounds pressure, thereby tending to maintain the natural juices within the meat with reduced shrinkage of the food product.

U.S. Pat. No. 3,232,767 is directed to a method of roasting meat in a pressure chamber partially filled with cooking oil by subjecting the cooking oil to a temperature of about 375° F. sufficient to heat the air surrounding the meat above the oil to a temperature of about 310° F. The chamber is maintained at a preselected pressure by supplying water to the fat, where the water vaporizes rapidly to produce steam and develop a pressure of 30 to 35 psi in the chamber.

U.S. Pat. No. 3,672,908 teaches a two-step pressurizing of a cooking chamber, first at atmospheric pressure prior to applying heat to the food, and secondly at superatmospheric pressure during cooking, before rapidly cooling the food after heating of same.

U.S. Pat. No. 3,884,213 is directed to a microwave cooking apparatus which additionally directs spaced discrete high velocity jets of heated air against the exterior surfaces of food products carried on a conveyor through the system to obtain food surface effects such as crisping and browning.

U.S. Pat. No. 4,089,260 is directed to a meat patty cooker for finishing precooked meat patties by subjecting compressed air in discrete laterally spaced flow paths as jets of preheated air against the opposed surfaces of the patty to produce browned or seared marks on the patty to simulate grill marks.

U.S. Pat. No. 4,737,373 is directed to a two-part cooking method, first slowly cooking poultry products in a slow cooker, and secondly in a browning oven where high temperature, high velocity air is impinged against the poultry for browning the same in a few seconds via discrete nozzles by air jets at 10,000 to 20,000 feet per minute and at a temperature of 750° F. to 1,000° F. U.S. Pat. No. 5,077,065 is directed to holding chargrilled or fried chicken products within a closed chamber subjected to a relative humidity of about 70 to 90% to reduce dissipation of moisture from the food.

While the methods and apparatuses of the prior art have employed compressed air both preheated and otherwise to effect browning and surface texturing of cooked meat and have attempted to control relative humidity within an oven or a pressure vessel, known pressure cooking processes using high pressure steam result in the cooked meat looking and tasting boiled rather than roasted.

It is therefore a primary object of this invention to provide a process and apparatus wherein whole food, and preferably poultry or parts thereof, pork, spare ribs and beef roasts and the like may be cooked in a very short time without frying, which uses extremely high temperature and extremely high pressure by convecting preheated air and superheated steam mixtures internally of a pressure vessel, with the cooked product being both plumb and juicy, having a fine textured surface and being well browned in the process.

It is a further object of this invention to provide a cooking apparatus which is of simplified form, which creates easily and effectively a compressed air and superheated steam mixture, which is diffused throughout the pressure vessel and which is forcibly convected throughout the interior of the vessel and whose exhaust is carefully controlled.

BRIEF DESCRIPTION OF THE DRAWING

The single FIGURE is a schematic diagram of a food cooking apparatus forming a preferred embodiment of the invention.

DESCRIPTION OF THE PREFERRED EMBODIMENTS

Referring to the drawing, the process and apparatus of the present invention may be readily understood from the single drawing which sets forth schematically elements of a cooking apparatus necessary to effect the process and to achieve rapid cooking of food products, particularly meat. Two pieces of poultry P in the drawing may be whole chickens, turkeys or the like. They may be of irregular form as shown, or more regular pieces of meat. The apparatus indicated generally at 10 is composed principally of a pressure vessel indicated generally at 12, which is of cylindrical form, being oriented horizontally and having a door 14 hinged by hinges 16 at the left end thereof and having a handle 18 for opening the door. Suitable means (not shown) may be provided for sealing the door 14 to the pressure vessel proper after inserting the poultry P or other pieces of food therein and upon closure of the door. The pieces of the poultry P are supported on meat racks 20 internally of the vessel. A drip pan 21 internally of the vessel 12 is mounted beneath the meat racks 20 to collect the juices and fat escaping from the poultry P during the cooking process. The pressure vessel 12 is provided with a circular band heater 24 provided with electrical leads 26 for connection to a suitable source of electrical energy (not shown) for maintaining the internal temperature of the pressure vessel 14 at a preselected temperature, preferably in the range of 400° F. to 600° F. Such high temperature is in excess of temperatures known to date for effectively cooking various foods, particularly meats including poultry, pork, beef, etc., such as pork spare ribs and beef roasts. Appropriately, the complete exterior of the pressure vessel 12 is enclosed in a suitable layer of thermal insulation 22, only a portion of which has been shown to permit viewing of the interior components of the pressure vessel.

The present invention advantageously employs forced convection of the air/superheated steam mixture internally of the vessel during cooking. A fan 33 has a motor 28 fixedly mounted to the cylindrical pressure vessel 12 exterior of the same with a motor shaft 32 projecting internally of the pressure vessel. A fan blade 30 mounted to shaft 32 provides convective flow of an air and steam mixture 66. Electrical leads 34 may be connected to a source of electrical energy (not shown). The speed of the motor output shaft 32 may be varied to control the flow rate of the gases internally of the pressure vessel prior to exhausting the same.

A pipe 36 extends upwardly from the pressure vessel and is open internally thereto. The pipe 36 has mounted thereon a pressure gauge and a pressure relief valve 38 which controls the exhaust, indicated by arrow 42, of the air/steam mixture and any vapors generated when cooking poultry P or the like food items during the cooking process. The pipe 36 downstream of the pressure gauge and pressure relief valve 38 includes a gate regulator 40.

The remaining elements of the cooking apparatus 10 involve the means for the creation of an air/superheated steam mixture, the preheating of the same and the diffusing of that mixture throughout the interior of the pressure vessel 12. In that respect, an air compressor indicated schematically by block 44 is driven by an electrical motor 46 via motor drive shaft 48. The electrical motor is connected by way of leads 50 to a source of electrical current (not shown). An air compressor discharge pipe 52 connects the air compressor via a flow meter and regulator unit 54 to a heat exchanger 58. Pipe 52 connects the outlet of the flow meter regulator unit 54 directly to heat exchanger 58. Heat exchanger 58 includes internally a heat exchange coil 59 which may be an electrical heat exchange coil or a heat exchange coil carrying a fluid such as the exhaust gases of an internal burner or the like. Coil 59 is capable of producing sufficiently high temperature to preheat the compressed air and steam mixture 66 prior to it entering the interior of the pressure vessel 12 as indicated by a series of arrows via a heat exchange outlet pipe 60 which connects to an air diffuser 64 internally of the pressure vessel 12. A control valve 62 within pipe or line 60 controls the flow of air and steam 66 from the heat exchanger 58 to the interior of the pressure vessel 12.

Steam is generated from a source of water, indicated by arrow W, which enters a fill line 86 and passes therethrough under the control of a shut-off valve 88 into the interior 80 of a water chamber 78. The water W' within the water chamber may be maintained at a particular level L by a float operated valve member or the like (not shown) associated with fill line control valve 88. A pressure equalizer line is provided at 82 which emanates from the compressed air feed line 52 intermediate of the flow meter regulator unit 54 and the heat exchanger 58 to ensure that the pressure within chamber 80 above the level of the accumulated water W' is equal to that of the interior of the heat exchanger 58. A shut-off valve 84 is provided within the pressure equalizer line. A pipe or line 74 connects the bottom of the water chamber to the interior of the heat exchanger 58 and line 74 includes a metering valve 72 for metering a specific rate of water from the water chamber to the interior of the heat exchanger 58. A shut-off valve 70 is provided within line 74 so that the water chamber may be isolated from the heat exchanger as desired. As may be appreciated, the cooking apparatus or oven 10 of the present invention is self-cleaning. Any spills or vapor condensing on the interior walls is readily evaporated and oxidized from all interior surfaces of the pressure vessel 12 and components thereof. Pieces of meat such as poultry P may be placed in the pressure vessel 12 and oriented either horizontally or vertically as desired. The drip pan 21 may be fixed internally or mounted for periodic removal. It is contemplated that the drip pan may be drained periodically as fumes and fat accumulate therein.

Typically, in operation whole poultry such as chicken or turkey as at P are placed in the pressure vessel on the meat racks 20. A mixture of preheated air and superheated steam 66 as for instance at 500° F. and 105 psig enters the chamber 12A via a line 60 and is diffused through the air diffuser 64 so as to spread evenly throughout the interior of the chamber. The chamber 12A is maintained at these conditions by the use of the band heater 24 in addition to the heat exchanger 58 and via the pressure gauge and pressure relief valve 38 in the exhaust line 36. There poultry P is cooked to a desired thigh bone marrow temperature. Assuming that the poultry P are whole chickens, that temperature may be 180° F. or higher. For such chickens, typically the cooking time is between 16 and 18 minutes. The set of conditions may be varied for cooking the chicken or like meat. For instance, a mixture of hot air and superheated steam at 500° F. may be employed at a low pressure such as 15 psig and whole chickens may be cooked to a thigh and leg joint temperature of 180° F., with the cooking time between 24 to 26 minutes. It is preferable that the pressure range be from 15 psig to 150 psig. The temperature inside the pressure vessel may be maintained in a range from 400° F. to 600° F. The flow rate of the preheated air and superheated steam mixture may be on the order of 12 scfm, however, such rate may vary. Typically, the air-steam ratio of the mixture 66 entering the chamber 12A may be on the order of 33% steam to that of the air/steam mixture, at 15 psig. Depending upon the size and the unitary or non-unitary nature of the meat being cooked, cooking times range generally between 13 and 29 minutes. While it may be appreciated that a cooking time of 24 to 26 minutes at air/steam mixtures at a pressure of 15 psig is one third longer than that of the cooking time experienced by like sized meats at 105 psig (at the same temperature), the pressure vessel operating at the much higher pressures of 100 to 150 psig inherently creates greater safety problems during practicing of the cooking method of this invention. The operation of the fan 33, which may be wholly internally of the pressure vessel 12, although the schematic representation shows the motor 28 exterior of the same, recirculates the hot gas within the chamber 12A, preventing hot spots and decreasing the cooking time of the poultry P or other foods.

It should be appreciated that the steam increases cooking by condensing on the relatively cold meat whole poultry P, where it gives up its heat vaporization to the cold birds. The steam content of the air/superheated steam mixture also improves yield (shrink decrease of product weight) and texture, thereby producing a juicier product. The higher the gas 66 internal pressure within chamber 12A of the pressure vessel over atmospheric, the denser the gaseous fluid 66 circulating by force convection internally of the chamber 12A. This increased density increases the rate of heat transfer from the air/steam mixture 66 to the poultry P. Thus, the inclusion of the steam to the compressed air stream decreases the cooking time while keeping the juices within the poultry P.

The method of cooking utilizing the apparatus as illustrated in the drawing is set forth hereinafter in a number of examples to show the utility of the invention. It should be kept in mind that while the cooking temperatures and pressures achieved by the preheated compressed air/superheated steam mixture produce a cooked food product within time periods rivaling that of comparative hot fat cooking processes, the applicant has found that pressure vessel chamber temperatures in excess of 600° F. and at pressure in excess of 125 psig causes burning of meat rather than purposeful uniform cooking and cooking of plumb and juicy whole chickens, turkeys, etc. with minimal shrinkage and a high degree of retention of the juices of such meat products. The optimal parameters of the inventive process as applied to various meats are those as set forth in the examples described below. As such, the operable temperature and pressure parameters for meats are believed to be 400° F. to 600° F. and 15 psig to 125 psig, respectively. Further, for fast food restaurants, and indeed restaurants in general, since high pressure cooking vessels constitute a hazard to the safety of personnel performing the cooking, it is envisioned that the invention is best applicable high heat cooking processes involving temperatures in the range of 500° F. to 700° F. and compressed air and steam pressures on the order of 15 psig.

EXAMPLE 1

A frying chicken at 38° F. weighing 1,644 grams was placed in the cooker 10. A mixture of air and steam preheated within the heat exchanger 58 was discharged into the cooker 10. The internal temperature of the cooker was maintained at 480° F. and the chicken cooked to a temperature of the thigh bone at 190° F. The air/steam flow was maintained at 12 scfm, with the superheated steam flow being 32.6% by weight of the air/steam mixture. The pressure internally of the chamber 12A was maintained at 15 psig by the pressure gauge and relief valve 38. The fan 33 was operated at high speed. The yield of cooked whole chicken was 71% by weight of the frying chicken prior to placement in the cooker.

EXAMPLE 2

Fresh pork spare ribs weighing 330 grams was placed in the cooker 10. The mixture of air and steam at 66 was heated by the heat exchanger 58 to maintain the internal temperature within chamber 12A of the cooker at 550° F. The ribs were cooked in 20 minutes and had a moist and tender consistency. The air/steam flow was maintained at 12 scfm entering the interior of the chamber 12A. The steam content of the air/steam mixture was maintained 32.6% by weight and the pressure internally of the chamber maintained at 15 psig.

EXAMPLE 3

A frying chicken weighing 1,723 grams at 65° F. was placed in cooker 10. A mixture of air and steam in heat exchanger 58 was heated and discharged into the cooker via line 60. The internal temperature of the cooker was maintained at 570° F. and the chicken was cooked until the temperature of the thigh bone was 181° F. Cooking time was 20 minutes, the air/steam flow was maintained at 12 scfm, the steam content was 32.6% by weight of the air/steam flow mixture and the pressure of the gas mixture internally of the vessel within chamber 12A was 15 psig. The cooked chicken provided a yield of 71% of weight at entry.

EXAMPLE 4

Chicken thigh and leg pieces were placed in the cooker 10. The air/steam flow preheated in heat exchanger 58 with a steam content of 13% by weight of the air/steam flow was maintained within the chamber 12A at a pressure of 105 psig. The chicken pieces were fully cooked in 13 minutes.

EXAMPLE 5

A whole chicken was placed in the cooker 10. The hot gas temperature within the cooker was maintained at 550° F., via an air/steam flow of 19% steam by weight at 12 scfm and the pressure within chamber 12A was maintained at 105 psig. The whole chicken was fully cooked in 17 minutes.

EXAMPLE 6

One-half of a frying chicken was placed in the cooker 10. The mixture of air and steam at 66 was preheated in the heat exchanger 58 and discharged into the cooker via air diffuser 64. The air/steam flow was maintained at 12 scfm, with the steam flow being 19% by weight of the air/steam mixture. The pressure internally of the pressure vessel was maintained at 15 psig and a working temperature of 550° F. The one-half frying chicken was completely cooked in 20 minutes to a thigh bone marrow temperature of 192° F.

EXAMPLE 7

Leg and thigh chicken parts were placed in the cooker 10. A mixture of air and steam with steam flow at 19% by weight of the air/steam mixture was preheated in the heat exchanger 58 and discharged into the cooker under an air/steam flow of 12 scfm. The internal temperature of the cooker was maintained at 500° F. The parts were thoroughly cooked in 18 minutes.

EXAMPLE 8

An 8 lb. turkey breast was placed in the cooker 10. The air and steam mixture at 19% steam by weight sent to the pressure vessel chamber 12A maintained the temperature therein at 550° F. and at a chamber pressure of 105 psig. The tasty 8 lb. turkey breast was cooked in 29 minutes to a moist and tender consistency.

In examples 1 through 8, the meat products were moist, very tasty and fully cooked, and the poultry was nicely browned.

In accordance with the previous description of the operation of the cooker 10 and by way of the eight examples described in some detail, it is apparent that various changes may be made in the apparatus illustrated in the drawing and described in the specification, as well as the process parameters as exemplified by those examples, without departing from the spirit and scope of the invention. While a gravity flow pressure equalized water feed system is employed in the illustrated embodiment via a metering valve, the control of the water/air mixture within or prior to entering the heat exchanger 58 may be accomplished by other means such as employing the compressed air passing through lines 52, 56 to act as the aspirating medium for the water in a conventional fluid actuated aspirator system such that the proper ratio of water to air may be achieved for maximizing the rapid rate of cooking of the meat such as the poultry P carried by the meat racks 20. Further, while all of the elements necessary to operate the apparatus 10 and to effect the cooking of the meat as rapidly as possible while maintaining the juices within the pieces of meat and effecting the browning where necessary of the exterior of those meat pieces, the apparatus and process is applicable to other food items such as popcorn, home fried potatoes, etc. It should be appreciated that the cooker 10 may be completely automated through a central control processor (CPU), with various elements thereof coupled to a common electrical source, through timers, thermostatically operated switches, thermocouple heat sensor buried within the meat and in contact with a thigh bone or the like of poultry P. As noted, the electrical heating coil 59 may be replaced by a hollow tubular coil through which the products of combustion of an internal burner burning a fuel and air mixture may be employed as the heat source for heat exchanger 58. This application by specific reference therefore incorporates the content of U.S. Pat. Nos. 3,232,767; 3,672,908 and 3,884,213 herein with respect to their control circuits and the components thereof for facilitating the controlled processing of meat by controlling the heating and gas pressurization of the cooker pressure vessel chamber 12A of applicant's drawing and the various valves for the various flows, and controlled operation of air compressor 44, heat exchanger 58, fan 33 via the flow meter and band heater 24 via the flow meter regulator 54, metering valve 72 and pressure gauge and relief valve 38. Other embodiments of the invention may thus be devised without departing from the invention as defined in the following claims.

I claim:

1. The method of rapidly cooking a food in a pressure chamber to produce the appearance, tenderness and flavor equivalent to meat or other foods roasted in a conventional oven with increased juice content, reduced shrinkage, said method comprising the steps of:

mixing superatmospheric compressed air and water, preheating said mixture to a temperature in excess of 400° F. to create a compressed air/superheated steam mixture, effecting a flow of said compressed air/superheated steam mixture through said pressure chamber in direct contact with said food and exhausting said flow from said chamber after contact with said food and maintaining said chamber at a temperature in excess of 400° F. at a superatmospheric pressure for a time period sufficient to cook said food such that said food is rapidly cooked by steam condensing on said food and giving up the heat vaporization of said steam while improving the yield and surface texture of the food.

2. A method of cooking meat in a pressure chamber comprising the steps of:

creating a flow stream of compressed air, mixing water with said compressed air flow stream in a weighted amount of water in the range of approximately 13% to 33% to that of the compressed air and water mixture;

preheating said compressed air and water mixture to create a flow stream of compressed air and superheated steam at a temperature in excess of 400° F. and injecting said flow stream of compressed air and superheated steam into said chamber in direct contact with said meat, and maintaining the temperature in said chamber in excess of 400° F. and at superatmospheric pressure until the meat is cooked; and relieving the pressure applied to the meat and removing the cooked meat.

3. A method of cooking meat in a pressure chamber comprising:

(a) placing said meat at ambient temperature in said pressure chamber at ambient pressure;

(b) sealing said chamber;

(c) feeding a mixture of superheated steam and compressed air at a temperature of least 400° F. into said chamber and pressurizing said chamber with said mixture to at least 15 psig;

(d) maintaining said temperature and pressure of said chamber until the meat is cooked; and (e) terminating said feeding of said mixture to said chamber and relieving the pressure applied to the meat and removing the cooked meat.

4. The method as claimed in claim 3, wherein said step of feeding said mixture of superheated steam and superatmospheric compressed air comprises feeding said mixture at a temperature in the range of 400° F. to 600° F.

5. The method as claimed in claim 3, wherein said step of pressurizing said chamber with said mixture to a pressure of at least 15 psig comprises pressurizing said chamber in the range of 15 to 150 psig.

6. The method as claimed in claim 4, wherein said step of pressurizing said chamber with said mixture to a pressure of at least 15 psig comprises pressurizing said chamber with said mixture in the range of 15 to 150 psig.

7. The method as claimed in claim 3, wherein said step of feeding a mixture of superheated steam and superatmospheric compressed air into said chamber comprises flowing said compressed air and steam mixture at a rate of approximately 12 scfm.

8. The method as claimed in claim 3, wherein said step of feeding a mixture of superheated steam and superatmospheric compressed air comprises feeding a mixture of superheated steam in a weight percentage of approximately 33% of that of the air/steam mixture.

9. The method as claimed in claim 3, wherein said step of feeding a mixture of superheated steam and superatmospheric compressed air into said pressure chamber comprises feeding said mixture through an air diffuser internally of said pressure chamber to cause said mixture to permeate throughout said pressure chamber.

10. The method as claimed in claim 3, further comprising the step of circulating said mixture of superheated steam and superatmospheric compressed air within said pressure chamber to move by forced convection throughout said chamber to facilitate said direct contact of said mixture with said meat to facilitate cooking thereof.

* * * * *